United States Patent [19]
Rossborough

[11] 3,958,313
[45] May 25, 1976

[54] METHOD, APPARATUS AND PRODUCT FOR IMPROVED PIPE-TO-MANHOLE SEALING

[75] Inventor: John C. Rossborough, Amherst, N.H.

[73] Assignee: Merchants National Bank of Manchester, Manchester, N.H.

[22] Filed: June 5, 1974

[21] Appl. No.: 476,476

[52] U.S. Cl. .............................. 29/157 R; 285/230; 285/237; 285/162; 29/237; 29/455 R
[51] Int. Cl.² ...................... F16L 3/04; F16L 5/02; F16L 21/08
[58] Field of Search .............. 29/157 R, 157 T, 237; 137/15; 285/18, 23, 24, 27–29, 33, 96, 99, 156, 330, 382.4, 382.7, 417, 420, 48–50, 53, 80, 110, 223, 230–233, 235–237, 162, 175, 323, 332, 332.1, 334.2, 334.3, 406, 407, 415; 403/15, 223, 274, 278, 281, 282, 291, DIG. 3; 52/758; 138/108, 107, 118, 118.1, 120, DIG. 11, DIG. 7

[56] References Cited
UNITED STATES PATENTS

| | | | |
|---|---|---|---|
| 3,406,988 | 10/1968 | Jones | 285/156 X |
| 3,585,699 | 6/1971 | Shuttle | 29/157 R |
| 3,700,265 | 10/1972 | Dufour et al. | 285/15 |

*Primary Examiner*—C. W. Lanham
*Assistant Examiner*—D. M. Gurley
*Attorney, Agent, or Firm*—Pearson & Pearson

[57] ABSTRACT

An underground joint between sewer pipe and reinforced concrete manhole riser is tightly sealed, and resistant to breakage caused by settling or frost heaving by a tapered, elastomeric, tubular connector boot, capable of flexing and yielding under lateral shift. A smooth faced hole is core drilled in the riser wall. The large end of the boot is expanded radially, by an expandable metal band, to a permanently enlarged diameter and internally clamped within the hole which compresses the material of the boot against the hole surface at 1000 psi, or more. The band is expanded and clamped in a direction normal to the central longitudinal axis of the sleeve by hydraulic jack means. The pipe end is inserted in the boot, up to the inside wall of the manhole, but is yieldable in any direction without leakage or breakage.

16 Claims, 22 Drawing Figures

METHOD, APPARATUS AND PRODUCT FOR IMPROVED PIPE-TO-MANHOLE SEALING

BACKGROUND OF THE INVENTION

This application is related to Divisional Application 374,029 filed June 27, 1973, continuation-in-part application 436,997 filed January 28, 1974, now abandoned and is a continuation-in-part of my co-pending application, Ser. No. 257,703 filed on May 30, 1972, now abandoned which is entitled: METHOD, APPARATUS, AND PRODUCT FOR IMPROVED PIPE-TO-MANHOLE SEALING.

In the art of underground sewer construction, the manholes which receive the sewer pipes are now usually pre-cast of reinforced concrete in a factory, with a base, one or more cylindrical risers and an upper section. For each installation it has been necessary for the engineers to specify to the factory exactly the location in the risers where the pre-cast portholes are to be located to receive the pipes. Not only is it time consuming and costly to cast such holes accurately in the risers, as they are centrifugally cast in the molds over the reinforcing framework, but an error in placement results in a commercially unacceptable product. In addition, upon delivery of such a manhole, with pre-cast portholes as ordered, to the site, it sometimes happens that the pipe in the ground is not properly aligned with the pre-cast portholes, thus causing time consuming fitting deep in a trench which is often wet.

Not only are pre-cast pipe holes difficult and costly to make in pre-cast risers, but the heretofore much used pipe joint and seal described in U.S. Pat. No. 3,348,850 to Scales of Oct. 24, 1967, calls for the pre-casting of a plurality of threaded inserts around the outside of such a pre-cast hole. In using this type seal, the inner face of the pre-cast hole cannot be cylindrical, but must be tapered to receive a compressible O-ring which is compressed by a bolt tightened ring of rigid material against the tapered face, such operation depending on the accuracy of the emplacement of the threaded inserts.

To produce a pipe-to-manhole joint not requiring threaded inserts, metal flange rings and compressed O-rings it has been proposed to provide a flexible manhole sleeve with a serrated flange at one end cast, or embedded, in the inner wall of the pre-cast porthole and having the other end sleeved around and strap clamped around the pipe. Not only has it been costly and time consuming to position such a flange for casting into the riser, but the embedment of the flange may tend to weaken the wall, while the permanent anchoring of the flange prevents easy replacement in case of damage in transit or on the site.

SUMMARY OF THE INVENTION

In this invention, the pre-cast portholes, and pre-cast portholes with embedded flexible sleeves of the prior art, have been eliminated entirely, so that the manufacturer may rapidly produce a plurality of centrifugally cast, reinforced-concrete, hollow cylindrical manhold risers free of pre-cast holes. Time and cost factors are thus reduced and existing casting machinery used more profitably. The placement of steps in the inside face of the riser is also eliminated.

After the pre-cast manhole risers of this invention have been fabricated, without portholes or embedded steps, the portholes are rotary core drilled through the riser wall and the step recesses are cut into the inside wall at the precise location desired. Such cutting may take place at the pre-cast factory, but preferably takes place at the site, after the manhole base has been lowered into place and the riser has been lowered thereon. The cutting apparatus and method of the invention includes the clamping of a frame on the rim of the upstanding wall of the riser so that the frame depends vertically down over the area to be cut. The exact center of the hole to be cut is marked by precision sighting along, or through, the actual pipe line already in the trench underground, so that the possibility of mislocation is avoided. Thereupon the cutter carriage and the cutter are moved on the frame to precise alignment with the centre mark. Cutting is then carried out along a circular path of cutting whose centre coincides with the centre mark to form an enlarged sewer pipe porthole which is defined by an exposed circular edge substantially greater than the outer diameter of the pipe to be connected.

The cutter frame, after being moved to each other location around the riser where a porthole is desired, may have a step hole drill inserted in place of the rotary porthole cutter and is used to precisely form the pattern of holes required to receive the expansible tips of the steps.

While, as shown in U.S. Pat. Nos. 3,090,260 to Brooks of May 19, 1963, and 3,293,952 to Fairbanks of Dec. 27, 1966, it has long been known to clamp a drill frame around a small diameter concrete pipe and cut out a core to insert a stub fitting, as far as I am aware no one in the prior art has heretofore proposed cutting a porthole in the relatively thick, reinforced concrete wall of a manhole riser, or to accomplish such cutting by affixing a frame and then moving a carriage and cutter on the frame to obtain precise alignment and accuracy.

In accordance with the present invention, I have conceived of an improved method of connecting a sewer pipe section into a manhole riser. The improved method is based on cutting a porthole in the riser about a reference point located as noted above and sealably joining the pipe and riser together so that an inner end of the pipe section may be yieldably supported in substantially concentrically disposed spaced relation to the exposed circular edge of the porthole.

To implement the method of the invention in one suitable manner, I have further devised special tubular connector boot means designed to be quickly attached in an operative position. The tubular connector boot means may be constructed in several different desirable forms which may be utilized to meet varying sewer pipe installation conditions.

Thus, FIGS. 1 to 10, inclusive, illustrate generally a method and apparatus for sealably joining together a sewer pipe and riser utilizing one form of tubular connector boot means. FIGS. 7 to 10, in particular, illustrate diagrammatically the separate steps of aligning to determine a reference point, cutting a porthole around the reference point, and thereafter attaching the connector boot means to a pipe section before the latter member is entered into the riser porthole.

Figure 10:
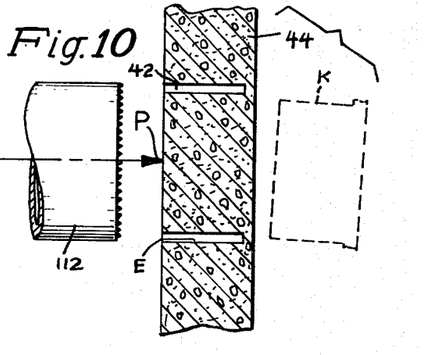
FIG. 10 is a diagrammatic view illustrating the cutting of a porthole.
Figure 11:
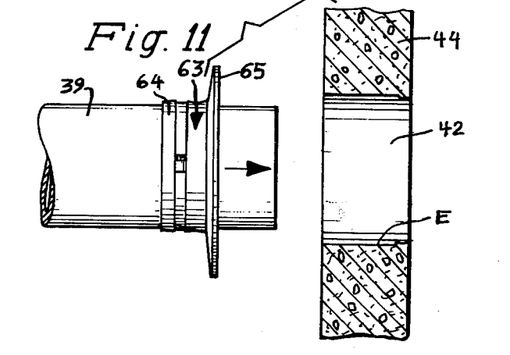
FIG. 11 is a diagrammatic view illustrating the step of attaching a connector boot to a sewer pipe prior to entering the pipe in the porthole.
Figure 12:
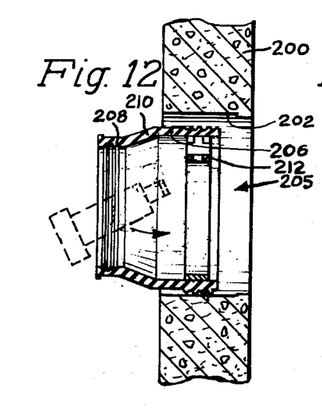
FIGS. 12, 13, 14 and 15 are diagrammatic views illustrating another method of utilizing a connector boot in which the connector boot is first inserted and clamped inside the riser porthole and thereafter a sewer pipe is inserted and secured inside the clamped connector boot.
Figure 13:
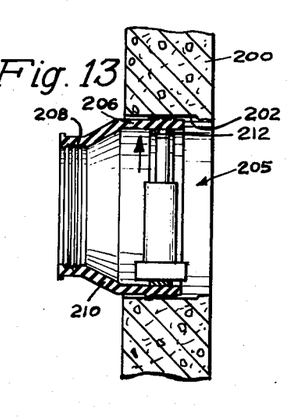

FIGS. 11 to 20 illustrate a method similar to that of FIGS. 1 to 10, but employing another preferred form of tubular connector boot in which the same steps of aligning and cutting are followed, but as shown diagrammatically in FIG. 11, the boot member is first installed inside the riser porthole and the pipe section thereafter attached.

Figure 21:
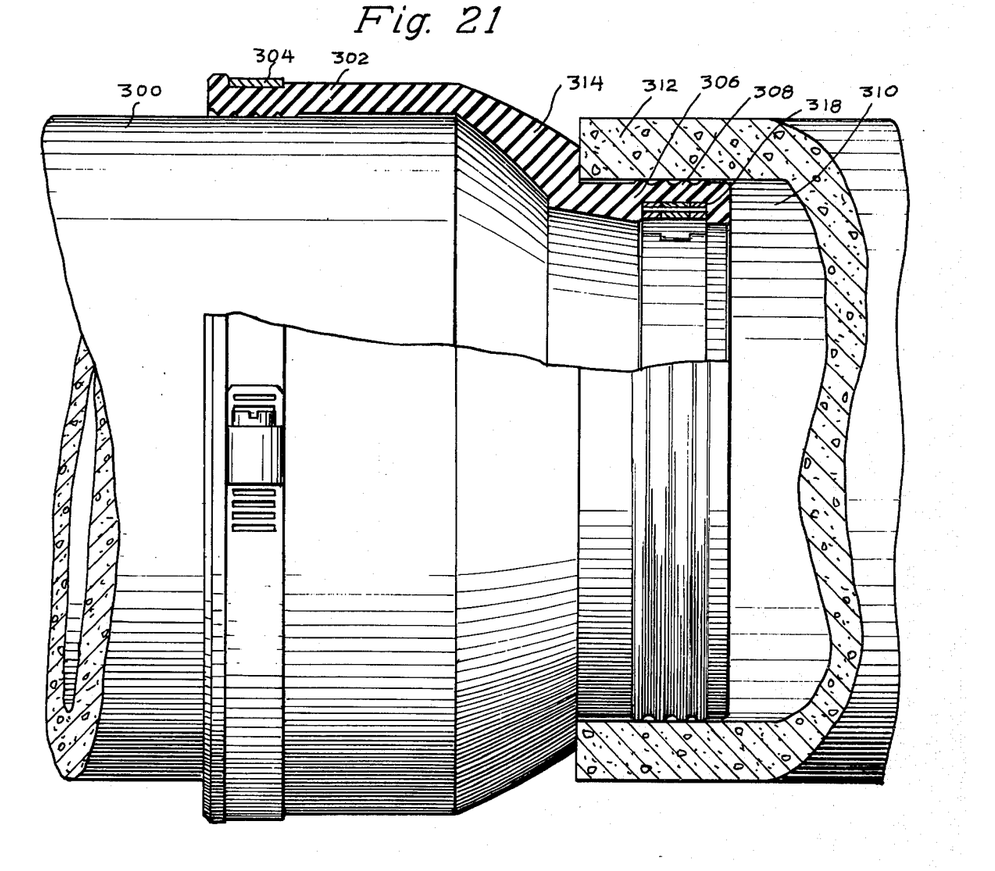
FIGS. 21 and 22 illustrate a modified form of connector boot employed to sealably join together a pipe section with another pipe section or other enclosure body with a hole therein.
Figure 22:
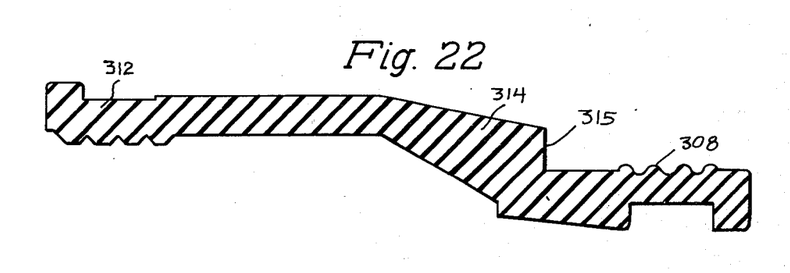

FIGS. 21 and 22 illustrate still another form of tubular connector boot designed for use in connecting together a pipe and another pipe or other enclosure body having a porthole defined by a circular edge.

In general the method illustrated in FIGS. 1 to 11 is based on the assumption that a manhole riser is to be cut on site and includes the steps of:

a. First locating a point of reference on an outer side wall portion of a riser supported at one side of a sewer pipe in a sewer line trench;

b. Then cutting the side wall of the riser along a circular path of cutting whose center coincides with the said point of reference to form a riser porthole;

c. Thereafter sealably connecting an end of a sewer pipe inside the porthole in substantially concentrically disposed relationship to the said circular edge by means of flexible tubular connector boot means. As shown in FIGS. 1 to 11, this is accomplished by solidly clamping one end of the connector boot around the pipe section and then introducing the pipe into the porthole and adhesively securing an outer flanged end of the connector boot means against the riser surface surrounding the porthole.

DESCRIPTION OF PREFERRED EMBODIMENTS OF THE INVENTION

Referring in more detail to the method and apparatus illustrated in FIGS. 1 to 11, a typical underground sewer system 30 includes a trench 31 dug to a level 32, well below the frost line 33 and well below ground level 34. The bottom 35 of the trench usually is somewhat wet and muddy and often has obstructions, such as existing old utility lines. Thus, in the past, precision fitting of pipes into manholes has been difficult in the relatively cramped work space available.

As explained above, there may be several sewer pipe lines, such as 36, 37, 38, at different levels, and at different angles of approach, all intended to lead into a particular manhole 41. Usually, each pipe 36 is rectilinear and formed of jointed sections 39, the pipe section 39 adjacent a manhole 41 having to be entered into a porthole 42 in the upstanding side wall 43 of the cylindrical riser section 44 and sealed therein. Each manhole 41 is pre-cast of reinforced concrete 45 with metal grid reinforcement 46, and, while a riser and base could be formed in one piece, the base section 47 is usually separate and provided with an annular flange 48 for seating a riser, the risers being joined by a suitable mating flange 49. Each riser 44 includes an upper rim 51, which is horizontal when the circumferential outside face 52 and inside face 53 of cylindrical wall 43 is upstanding and vertical on the base 47.

Unlike the pre-cast, reinforced concrete manholes, or manhole risers, of the prior art, the manhole 41 and its risers 44 are free of pre-cast portholes or step holes and, therefore, may be manufactured at a rapid rate with no delay in forming spaces in the reinforcing mesh for the core of the porthole, arranging support for the core, and carefully attempting to locate the core exactly where specified by the engineers, such location occasionally proving to be out of line with the pipe as actually installed in the excavation. Instead, the porthole 42 of the invention is cut through the cylindrical wall 43, at the site 30, either on a crane truck 54 having a turntable 55, hoist crane 56 and vertically movable cutter carriage 57 with rotary cutter 58, after careful measurement under existing installation conditions, or preferably by cutting the riser while leveled and accurately emplaced on the base 47 in the trench 31.

Figure 4:
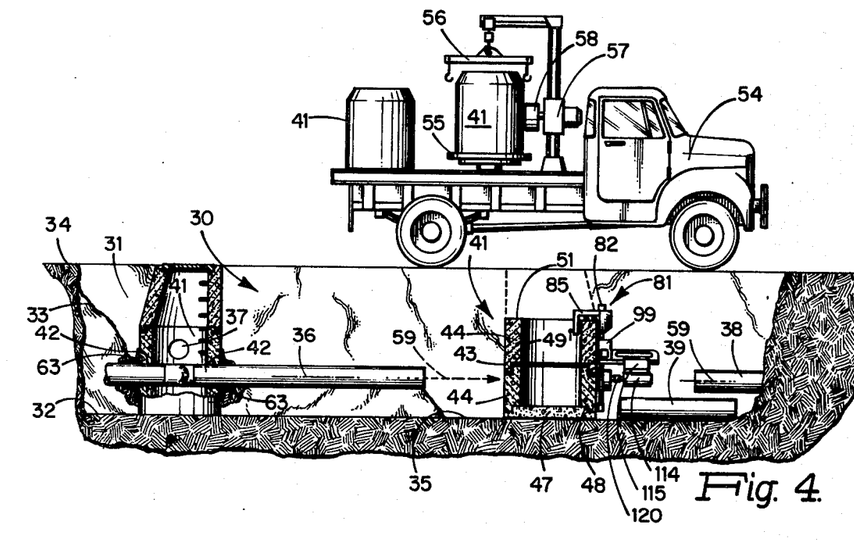
FIG. 4 is a side elevation, in section, of a sewer installation on a reduced scale.

Thus, as shown in FIG. 4, the pre-cast risers 44 are delivered on the site, placed on the base 57 and suitable transit, or other engineering equipment or sighting systems, is used to sight along an already installed pipe 37, 38 or 39, or through the same along the central longitudinal axis from an adjacent manhole to precisely mark on the outside curved surface 52 of the riser a reference point P which marks the exact center of the area where the porthole 42 is to be cut. Cutting then takes place along a circular path of cutting whose center coincides with this point P. The sighting step is indicated diagrammatically in FIGS. 7 and 8. FIG. 10 further illustrates diagrammatically the cutting step carried out to form a knock-out core K and provide a porthole 42 defined by a circular cutting edge E. Because dependence is not placed on a pre-cast porthole, the smooth, unobstructed, inner cylindrical face 61 of cut porthole 42 need not be overly large with relation to the outside diameter of the pipe section 39 to be sealed therein, so that clearance can be minimal and just sufficient to permit slight adjustment due to any settling.

It will be understood that the riser need not be cylindrical and that some risers are polygonal in cross section. Similarly the inner cut face 61 may be stepped, or countersunk, or cut face 61 may be tapered by reaming. Unlike a pre-cast hole, the face 61 will almost invariably include at least two exposed cut ends 127 of a reinforcing wire 46.

Figure 1:
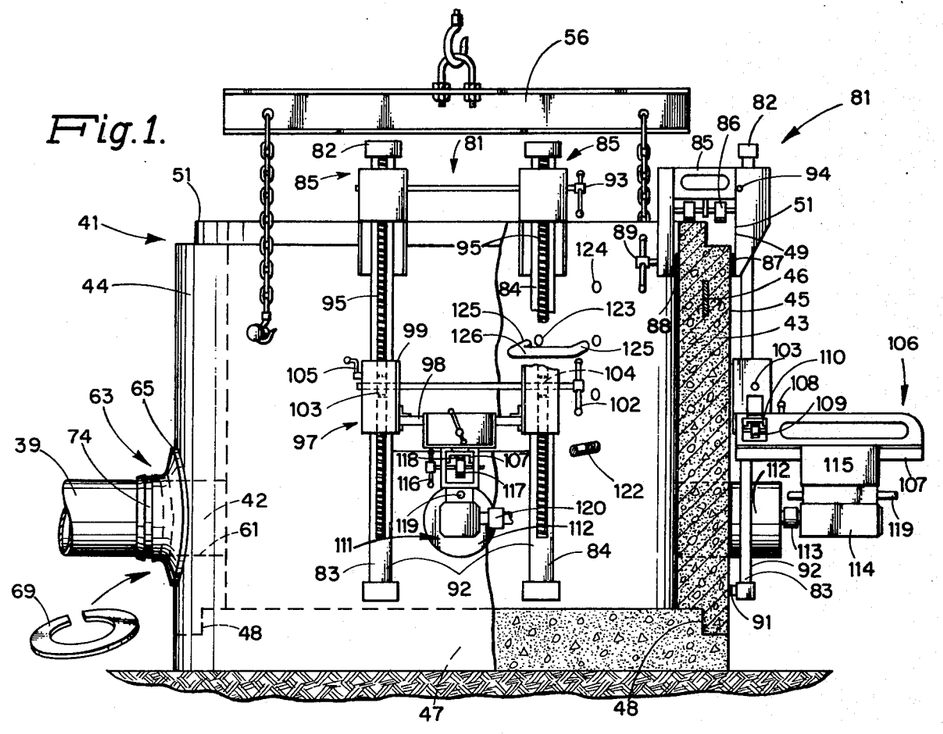
FIG. 1 is a side elevation of a manhole riser, set on a base, in a trench with on-the-site cutting of a porthole being accomplished.
Figure 2:
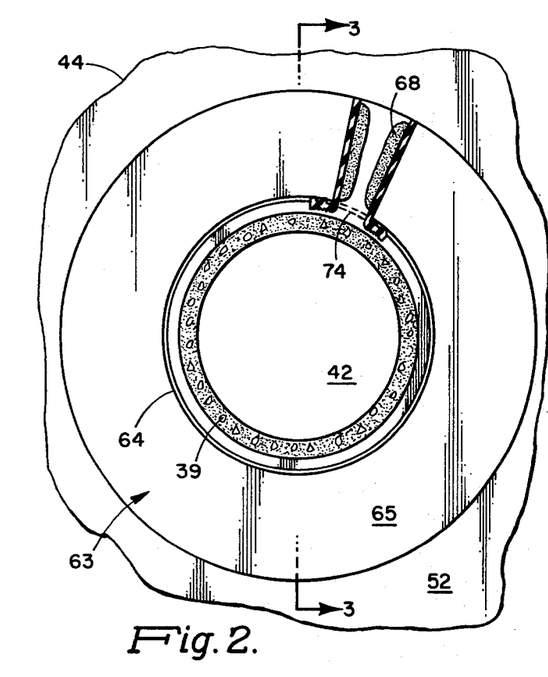
FIG. 2 is a front elevation on an enlarged scale of a flexible collar of the invention, in section, on line 2—2 of FIG. 3.
Figure 3:
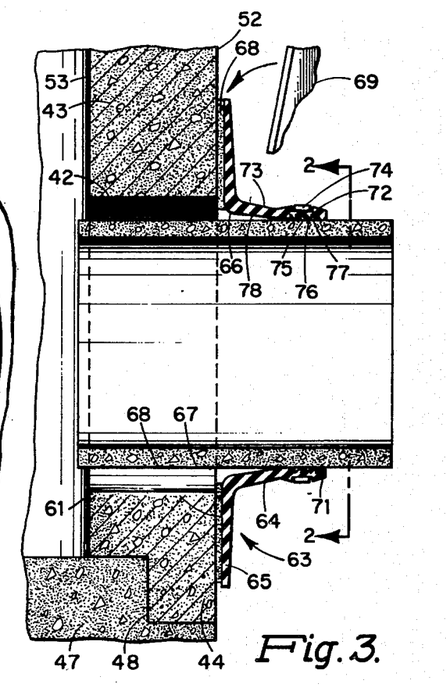
FIG. 3 is a side elevation, in section, on line 3—3 of FIG. 2.

As best shown in FIGS. 2 and 3, this invention includes a flexible connector boot construction in a one-piece unitary quick attachable collar 63 for sealing the cut portholes 42, each collar 63 including an elongated sleeve 64 for receiving the end of a pipe section 39 and an integral, outwardly projecting, annular flange 65 at one end 66 of the sleeve. Preferably, the sleeve is about the same length as the distance the flange projects therefrom, this being at least three, and preferably about four inches for the size pipe and porthole shown, since a four-inch flange will seal the porthole even if, for installation reasons, it is decided to cut the hole several inches larger than the pipe diameter to accommodate grade levels.

The flange 65 extends in a plane normal to the longitudinal axis 59 of the pipe section 39 and is of gradually decreasing thickness, so that it is resilient, and of predetermined distortability to conform to the curved configuration of outside face 52 of wall 43 without pleating or wrinkling. Preferably, it is of elastomeric material such as Neoprene and the outer annular face 67 thereof is finely corrugated, or ribbed and grooved. A layer of pressure sensitive adhesive 68, such as self-adhering mastic, covers face 67, the layer 67 being covered during shipment by an annular, peelable, masking strip 68 of non-absorbent paper. A suitable adhesive is a three part epoxy available as Bonstone A108-B108-C108 from Bonstone Inc. of Winona, Minnesota. The other end 71 of sleeve 64 if cylindrical and provided with an annular clamp receiving groove 72 on the exterior face 73 thereof, for a ring clamp 74 and with corrugations 75 formed of alternate ribs 76 and grooves 76 on the interior face 78 thereof, so that a tight seal is obtained when the collar is affixed on the pipe.

Thus, after the holes 42 are cut in the riser, a collar 63 is sleeved over the pipe section 29, as shown in FIG. 11, and the end of pipe 39 is entered in the hole, the masking strip 69 peeled off and discarded and the adhesive layer 68 on face 67 intimately applied to the exterior face 52 of wall 43 around the hole 42 to seal the porthole. The outer end of the collar is then clamped by clamp 74. Back filling and hydrostatic pressure on the outside of the manhole assure a watertight seal.

Figures 5, 6:
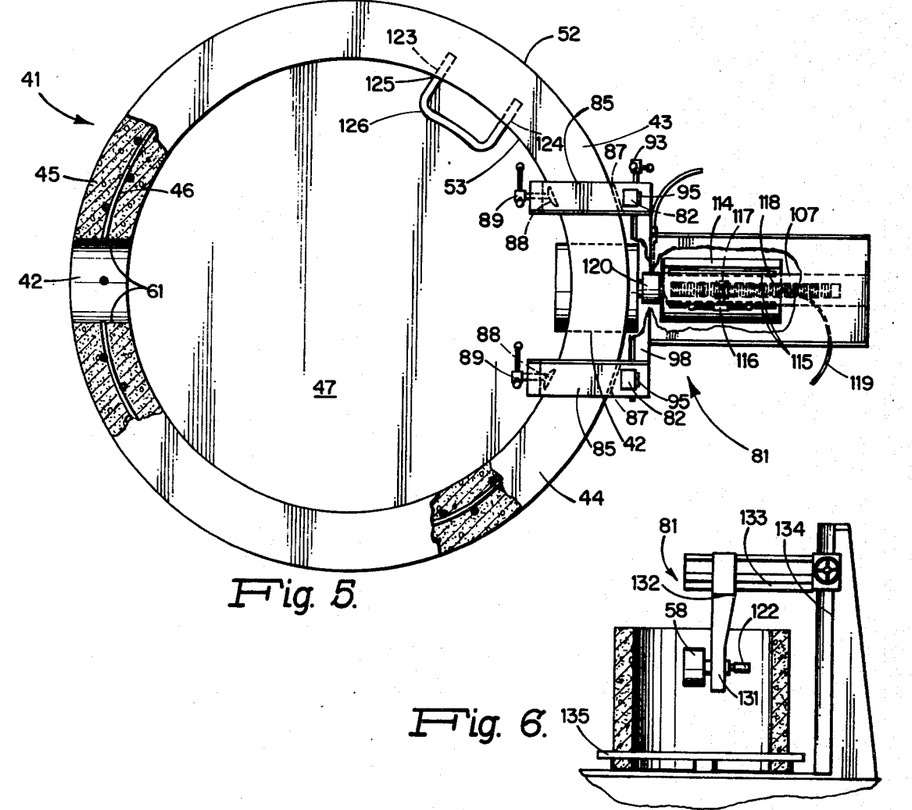
FIG. 5 is a plan view of the manhole riser shown in FIG. 1, with the cutting apparatus of the invention clamped on the rim of the riser, and partly broken away to show a cut porthole face.
FIG. 6 is a side elevation of an in-plant cutter.
Figure 7:
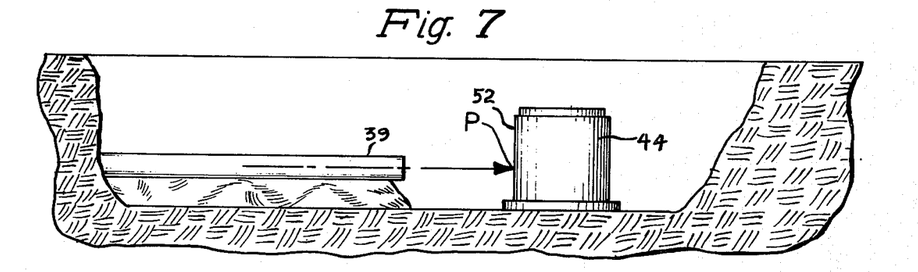
FIG. 7 is a diagrammatic view illustrating the step of aligning and locating a point of reference on a manhole riser.
Figure 8:
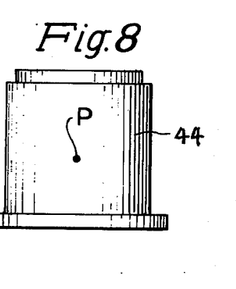
FIG. 8 is a diagrammatic view illustrating on a riser wall surface a point of reference noted in FIG. 7.
Figure 9:
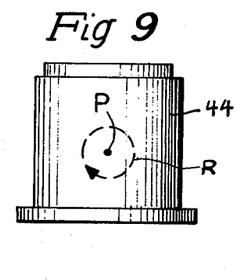
FIG. 9 is a diagrammatic view illustrating a circular path of cutting carried out around the point of reference to form a porthole.

As best shown in FIGS. 4 and 5, the cutter apparatus 81 of the invention, when portable, includes frame means 82 consisting of a pair of posts 83 and 84 of circular cross section, arranged to depend vertically on the outside circumferential face 52 or the inside circumferential face 53, of the upstanding wall 43 of a riser by clamp means 85 detachably affixed on the upper rim 51 of the riser. The clamp means 85 includes rollers, or wheels, 86 in the respective clamp brackets for riding on the upper rim while the frame means is moved sidewise to a position over the area where a porthole 42 is to be cut. Means 85 also includes a fixed jaw 87 and a threadedly tightenable movable jaw 88 on each means, together with a handle 89 and a lower rubber pad 91, all for the purpose of quickly mounting, aligning and clamping the frame 92 in position. The posts 83 and 84 are jointly movable vertically in the clamp means by handle 93, gears 94 and gear racks 95 to provide a rapid, coarse vertical adjustment thereof.

Cutter carriage means 97 is provided comprising the carriage 98 having a pair of sleeves 99 and 101 vertically guided on posts 83 and 84, the carriage being finely adjustable vertically by the handle 102, gears 103 and 104 and lockable by the lock 105.

Cutter track means 106 includes the cutter track 107, the track 107 being movable horizontally relative to the carriage for fine adjustment thereon, by the handle 108, gear 109 and gear rack 110.

The cutter assembly 111 includes the rotary core drill 112, a chuck 113, motor 114 and motor support 115, movable on track 107 in a path normal to the plane of wall 43 by the handle 116, gear 117 and rack 118. Motor 114 is an air, or hydraulic motor fed by fluid line 119 and water jets are supplied to the cutter through fluid line 120.

On the site, after the cut portholes are formed by the rotary core drill 112, and the flexible collars 63 sealed over the portholes, the cutter apparatus may be removed from the outside, if on the outside, and suspended on the inside of the manhole 41, with a step hole drill 122 inserted in chuck 113 in place of the core drill 112. A pattern of step holes such as 123 and 124 are then cut in a location within the manhole which does not interfere with the pipes therein by moving the cutter and carriage on the frame, whereupon the expansible tips 125 of metal steps 126 are inserted in the holes. Steps 126 may be metal, plastic or of other suitable material.

It will be understood that the invention herein, with its easily pre-cast risers, on-the-site, precisely cut, pipe-to-manhole openings and adhered flexible collar seals over the openings enables a pipe producer to make manholes profitably with existing equipment, to offer instant manhole service to contractors and to provide contractors with flexibility at the installation. It has been found that it takes three times as long to produce a manhole section with pre-cast portholes, as it does to first pre-cast the riser free of such holes and to then cut the holes afterwards. At the installation, contractors and engineers are enabled to make both horizontal and vertical adjustments from specifications to overcome adverse natural conditions, thereby reducing the threat of almost any obstacle in the line of placement.

As shown in FIG. 6, an in-plant cutter apparatus 81 preferably will include a motor carriage 131 having a porthole cutter 58 on one end and having a pair of stephole cutters 122 on the other end, the carriage 131 being rotatable at 132, horizontally movable on track 133 and vertically movable on a suitable frame 134 and the risers being turnable on turntable 135.

While an adhesive is preferred for affixing the flange outer face 67 to the face 52 of the riser, the affixation could be accomplished by use of a clamp ring attached with anchor bolts, or by other suitable mechanical fastening mechanisms, but the pressure sensitive adhesive 68 is much more practical, rapid and efficient.

When the pipe-to-manhole seal of this invention is to be accomplished in the plant rather than on the site, the manhole is first pre-cast of wire meshed, reinforced concrete, free of pre-cast portholes. If, for example, the pipes to be sealed are of twelve inch outside diameter, the portholes are then cut by apparatus 81, as in FIG. 6, with fourteen inch diameter where specified by the engineers. The face 67 of the flange 65 of each collar 63 is then affixed around the cut hole by the rubber to concrete adhesive 68, and the flange also anchored in place by one or more concrete penetrating studs to prevent slippage while the adhesive firmly sets in about an hour. The manhole is then delivered to the site with the collars in place ready to have the pipes inserted and ring clamped in the collar sleeves 64, there being sufficient flexibility in the material of the collar and sufficient clearance between the twelve inch pipe and fourteen inch hole to permit considerable adjustment of angle of the pipe laterally. When the collar is adhered on the site, it may be slid laterally for adjustment for one or two inches while still retaining the preferred outer two and one half inch annular, peripheral, corrugated, band of intimate adhesive contact with the face of the riser. Backfilling will hold the flange in place for the time it takes for the adhesive to set but in addition, the flange may be studded, or ringed and studded into the concrete as extra assurance of a firm adhesive bond.

An an alternative to sealably attaching a connector boot by an adhesive, as illustrated in FIGS. 1 to 11, I may, as earlier pointed out, desire to eliminate the use of a flange or other means of securing the connector boot to the outer wall surface of a manhole riser. Instead, I may desire to provide for sealably engaging a connector boot inside a porthole in a riser to provide a yieldable or flexible joint which, in some stances of use, may be superior to an externally mounted joint.

In this connection, it will be understood that with shifting weight loads of backfill exerted on a flexible joint in some pipe line installations, an advantage may be realized by supporting a portion of a connector boot against shear forces so as to utilize the edge of a porthole as bearing means for imparting greater rigidity and stability to a clamped portion of the connector boot while allowing for a controllable degree of yieldability at points in the connector boot immediately adjacent the riser porthole. However, to realize the advantages of an internally supported connector member, it is necessary to provide a clamped relationship which is exceedingly strong and resistant to displacement forces in a filled sewer pipe line.

With this in mind, I have conceived of a method of fluid pressure actuated clamping in which a specially formed clamping end of a connector boot is compressed against an edge of a porthole in a manner such that the parts are sealably joined together in permanently maintained water-tight relationship. i have further devised a connector boot shape having a series of externally moulded beads located around the clamping end. Inside the clamping end is provided a fluid pressure actuated expander apparatus which is capable of forcing inner portions of the connector boot radially against the edge of a porthole, in a direction normal to the central longitudinal axis of the porthole, boot and sewer pipe, with sufficient intensity to compress and deform the beaded portions of the connector boot so that they will fill in surface irregularities of the porthole edge and provide a permanently maintained sealing relationship with the porthole edge. The connector boot shape has also been constructed with an external clamping end to receive therein and secure a pipe section in a manner such that an inner end of the pipe section is supported within the porthole, with its inner edge proximate the inner edge, or lip, of the manhole at the inner wall of the riser (FIG. 15) the sewer pipe being in spaced concentrically disposed relationship with the externally clamped end. In addition, the clamp type connector boot apparatus has been designed in a form such that the parts can be conveniently set up and installed very quickly in a riser porthole in a sewer pipe trench.

The fluid pressure actuated expander apparatus includes an internal expanding clamp and a toggle device supported in an inner channeled portion of the clamping end of the connector boot.

Figure 14:
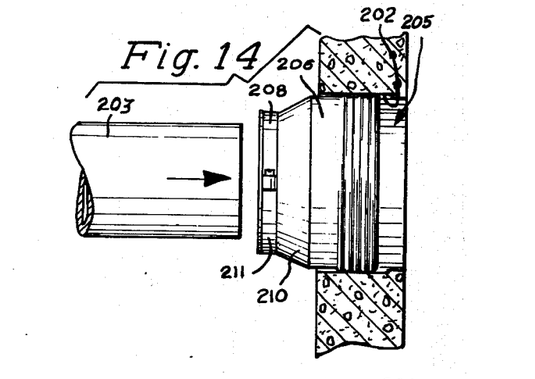
Figure 15:
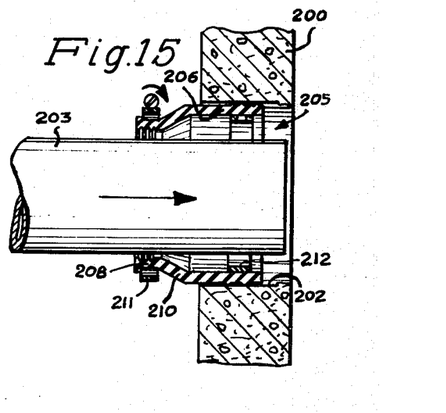
Figure 16:
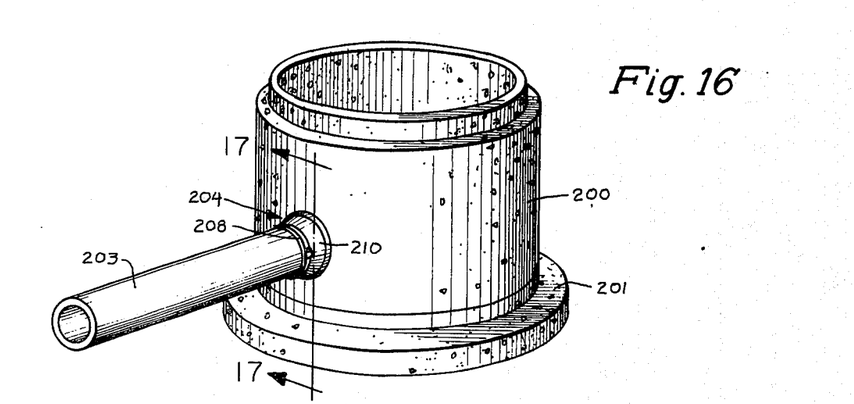
FIG. 16 is a perspective view of a sewer pipe and manhole riser sealably joined together by means of a connector boot installation of the type illustrated in FIGS. 12 to 15.

FIGS. 11 to 20 are illustrative of a preferred method and apparatus for sealably clamping a connector boot inside the edge of a manhole porthole. This method is based on the same technique of sighting and cutting out a porthole around predetermined point of reference disclosed in FIGS. 1 to 11. However, in the clamping method of FIGS. 11 to 20, the specially formed connector boot extremity is first mounted inside the edge of a porthole or other opening in a position to be clamped against the circular edge of the porthole in solidy sealed relationship therewith as suggested in FIGS. 12 and 13. Thereafter, a pipe extremity is inserted in an opposite end of the connector boot as shown in FIG. 14 and the end is solidly clamped around the outside of the pipe as indicated in FIG. 15.

Figure 17:
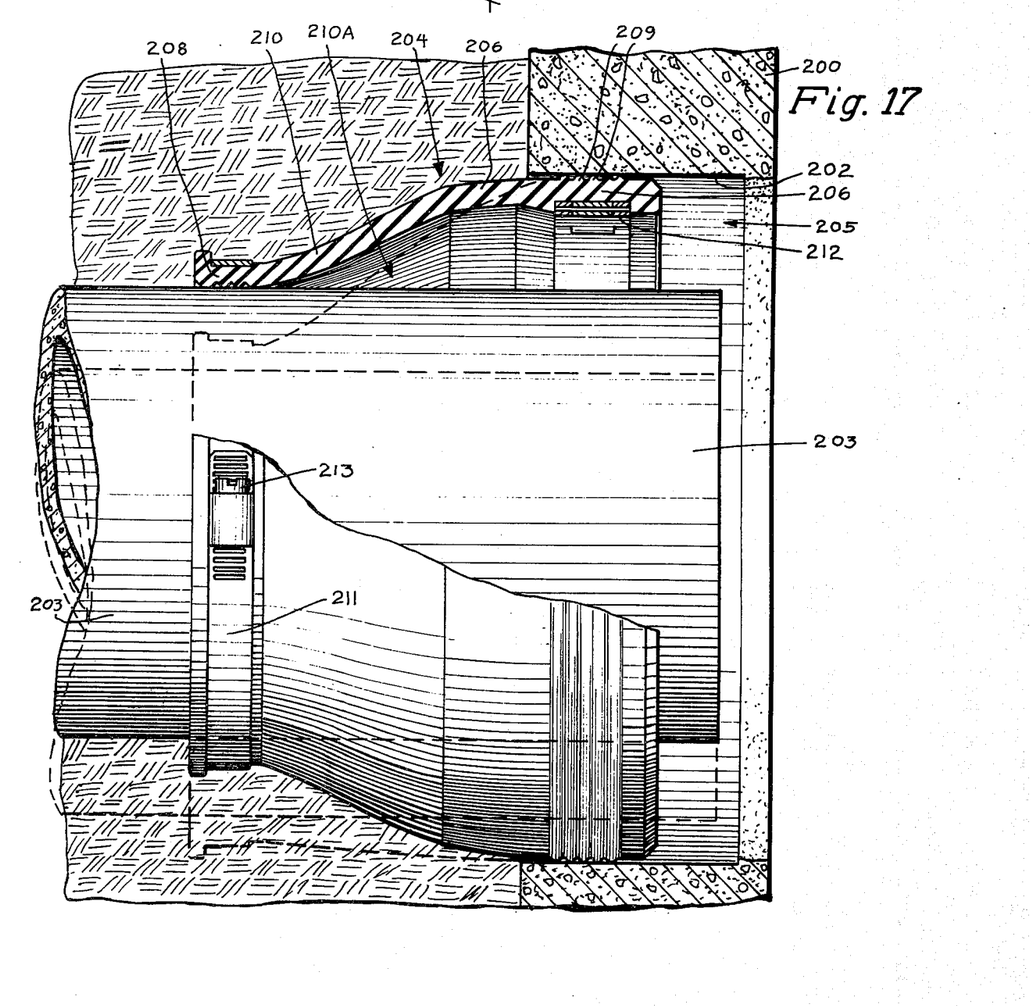
FIG. 17 is a cross section taken on the line 17—17 of FIG. 16, and further indicating diagrammatically an overlying soil body.

Referring in more detail to the structure shown in FIGS. 12 to 20, numeral 200 denotes a manhole riser mounted on a base 201 and having formed therein in the manner earlier disclosed a porthole 205 defined by a circular edge 202 as is most clearly shown in FIG. 17. Inserted in the porthole 205 is an extremity of a pipe member 203 whose outer diameter is appreciably smaller than the inner diameter of the porthole 205 as noted.

In accordance with the invention, the pipe 203 and the riser 200 are held in sealably joined relationship by a clamp type connector boot generally denoted by the arrow 204. The connector boot means 204 is shown in a fully clamped operative position in FIGS. 16 and 17 and is also shown in more detail removed from the riser and pipe in FIG. 18.

Figure 18:
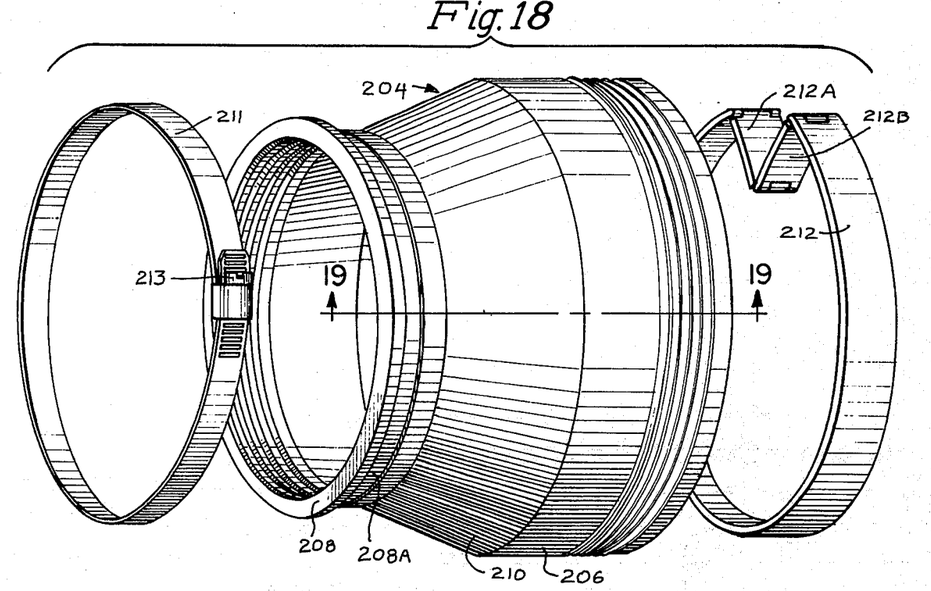
FIG. 18 is an exploded view showing in perspective the sealing joint components of FIG. 16.

As indicated in the latter Figure, the connector boot comprises an elongated flexible tubular body having an internal clamping end 206 of a cylindrical shape and size suitable for loosely engaging within the porthole 205. Located around the outer surface of the clamping end 206 are spaced beads or ribs 209 which are deformable under pressure to fill in irregularities in the riser porthole edge in the fully clamped position shown in FIG. 17.

Pressure is exerted against the clamping end 206 by an internal clamping band 212 which includes a toggle expander device consisting of toggle arm 212a and 212b. The band and toggle arms are more clearly shown in FIGS. 18 and 20. With the toggle arms forced into a position such as that shown in dotted lines in FIG. 20, the band 212 becomes expanded as shown under a pressure of, for example, 1000 p.s.i. or higher, and the end 206 of the connector boot is solidly compressed against the porthole edge 202.

Figure 19:
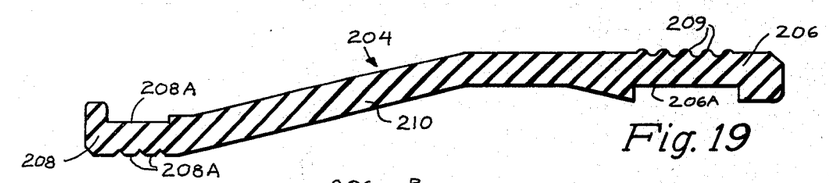
FIG. 19 is a cross section taken on the line 19—19 of FIG. 18.
Figure 20:
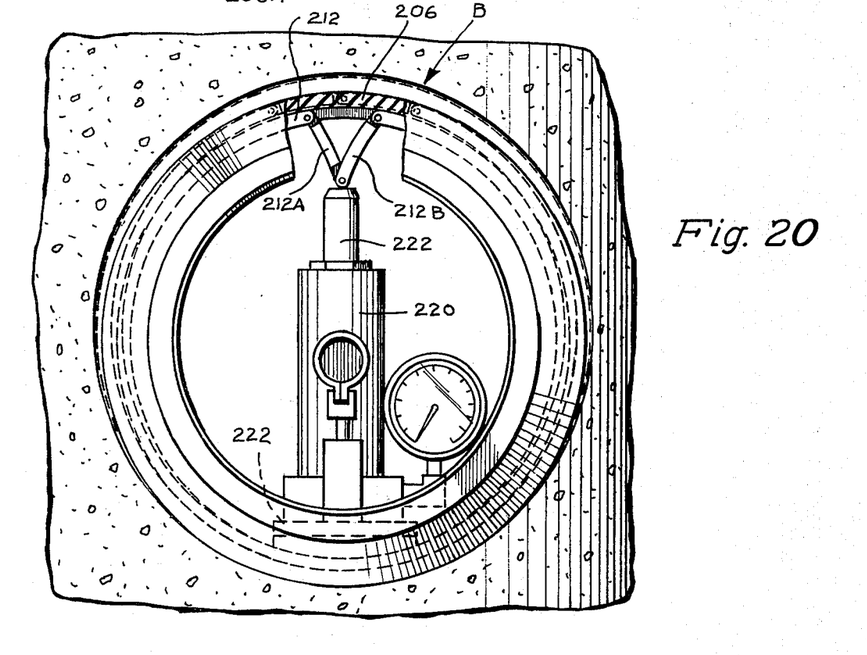
FIG. 20 is an end elevational view of the connector boot located in a riser porthole and further indicating fluid pressure actuated expander means for clamping the boot inside the edge of the porthole.

Pressure suitable for forcing the toggle arms 212a and 212b into the fully extended dotted position of FIG. 20 is provided by a hand-operated hydraulic cylinder 220 which operates to force a plunger member 222 against the toggle arms 212a and 212b, as suggested in FIG. 20. The hydraulic cylinder 220 is provided with a base part 222 having a slightly convex bottom which is designed to seat against the connector end and the underlying porthole edge. When the cylinder is operated, the plunger 222 forces the toggle arms outwardly and radially of the smooth edge of the porthole and provides an over-center travel which positions the arm in a self-locking position so that they constantly maintain pressure. The internal clamping band 212 is preferably contained in a channeled portion 206a of the end 206 as best shown in FIG. 19.

At its opposite extremity, the tubular connector body is formed with an external clamping end 208 also of a cylindrical shape but appreciably smaller than the end 206 so as to loosely engage around the outer periphery of the pipe 203. This end 208 is also formed with a series of beads 208a. An external clamping band 211 located in a channel 208a is solidly clamped by screw driver pressure exerted through a tightening screw 213. This pressure deforms the beads 208a and clamps the end 208 in tightly sealed relationship around the pipe.

Extending between the parts 206 and 208 of the connector boot is an intermediate flexible tubular body portion 210 which is of a gradually decreasing size and designed to yieldably join the parts 206 and 208 together so that relative movement of one to the other may take place under varying stress forces.

It will be observed that by the arrangement described, the outer external clamping portion 208 is operative to support the pipe member 203 inside the expanded internal clamping part 206 in substantially spaced concentrically disposed relationship therewith. There is thus provided a relatively large clearance space 210a (FIG. 17) which allows for pipe displacement in a horizontal direction and also in a vertical direction, for example, up to two inches and more, and displacement can also take place in any angular direction up to 22°. In the preferred form of boot shown in FIGS. 12 to 20, the intermediate tubular body portion 210 may consist in a truncated conically shaped body as is more clearly indicated in FIG. 19, and may consist of a plastic material similar to that earlier disclosed as utilized in the connector boot means of FIGS. 1 to 11 having an external sealing flange.

It should be further noted that with the internally clamped engagement of the connector boot end 206 against the riser porthole edge, there is realized a high degree of resistance to vertical shearing forces acting to break the connector boot seal, and the porthole edge along its lower portion especially functions to provide a rigid bearing surface for resisting backfill pressure.

In FIGS. 20 and 21, there is illustrated a modified connector boot construction which may be employed to connect a pipe end to another pipe or any other enclosure body having a hole defined by a circular edge. As shown in FIG. 21, a pipe 300 is solidly secured by a connector boot member having an external clamping end 302 and a screw-fastened external clamping band 304. At its opposite end the connector boot is formed with a reduced internal clamping end 306 having beaded portions 308. The outer diameter of the end 306 is made of a size such that it may engage loosely within an opening 310 of a second pipe member 312. This reduced end 306 may also extend outwardly from a shouldered intermediate part 314 having a surface 315 against which the end of the pipe 312 may abut to limit travel of the connector boot therethrough.

I claim:

1. A method of yieldably and flexibly connecting a section of sewer pipe into a side wall of a manhole riser, vertically disposed in a sewer line trench, in which the sewer pipe is received at one side thereof, by means of a flexible tubular connector boot, said method comprising the steps of:
   determining a point of reference on the outer surface of the manhole riser through which the central longitudinal axis of the sewer pipe is to be located;
   core drilling the reinforced concrete wall of said riser along a circular path of coring, whose centre coincides with the said point of reference, to form a sewer pipe porthole, of predetermined greater diameter than the diameter of said pipe, defined by an exposed, smooth, circular edge surface;
   inserting one end of said connector boot in a loose fit in said porthole, then expanding said end radially in a direction normal to the axis of said porthole and internally clamping said expanded end against the smooth surface of said porthole to seal the same;
   then inserting the inner end of said section of sewer pipe into said boot and inside the pipe porthole, and then externally clamping the opposite end of said boot around said pipe section.

2. A method according to claim 1 wherein:
   said step of expanding said end of said boot, and internally clamping the same, consists in expanding an internal clamping band against the inside of the boot to increase the diameter of the band and thereby compress the material of the boot against the edge surface of the porthole in a radial direction.

3. A method according to claim 2 wherein:
   the internal clamping band is expanded by fluid pressure actuated means, the fluid pressure being exerted radially of said porthole, at a clamping pressure of at least 1000 psi.

4. A method according to claim 1 wherein:
   said expansion and clamping steps are accomplished by expanding a clamp band, having a pair of toggle arms, by means of an hydraulic jack applied against the toggle arms, to increase the diameter of the band.

5. A method according to claim 4 wherein:
   the toggle arms are moved through an over centre path of travel into a locked position in which internal clamping pressure is constantly maintained.

6. In a method of yieldably and flexibly joining together a pipe member and an enclosure member having an opening defined by a circular edge by means of a flexible tubular connector member the steps of:
   loosely fitting one end of said tubular connector member inside the opening;
   then internally clamping said end of the tubular connector member against the circular edge in sealed relationship therewith, by pressure exerted radially of said opening and normal to the axis of said tubular connector member;
   then inserting an end portion of the said pipe inside the tubular connector member to extend well within said opening and up to the end of said tubular member, and thereafter externally clamping an opposite end of the tubular connecting member around the outer surface of said pipe.

7. A method of attaching a flexible tubular connector member to an enclosure body having a hole therein which comprises the steps of:

locating an end of the flexible tubular connector member in the hole;

then applying pressure in a radial direction, normal to the axis of said hole and to the axis of said connector member, against the inner surface of said connector member to expand the said end thereof into tightly sealed engagement with the edge of the hole, and internally clamping said end in said expanded, tightly, sealed condition within said hole, said steps of expanding and clamping being accomplished by hydraulic jack pressure exerted against the toggle arms of a split clamp band until the toggle arms are moved radially outwardly beyond centre to a locked expanded position.

8. Apparatus for sealably and flexibly joining together a pipe member and an enclosure body formed with a hole which is defined by a circular edge, said apparatus comprising:

a flexible, elongated, tapered, tubular boot of elastic, rubber-like material, having a small cylindrical, pipe-clamping end, a large cylindrical hole-clamping end and a tapered portion extending between said ends to provide for flexing displacement of one end with respect to the other, external clamping means mounted around the pipe clamping end;

internal clamping means supported inside the hole clamping end, said means including a radially expandable clamp means adapted to increase in diameter and lock in increased diameter condition;

and a fluid pressure actuated member, mounted within the hole clamping end of said boot, and in engagement with said expandable clamp means for applying pressure thereto to expand and seal said end in said hole.

9. A flexible connector for sealably joining together a pipe member and an enclosure body having a hole formed therein, said connector comprising:

an elongated, flexible, tapered tubular sleeve of elastomeric material having a small pipe-clamping end and a large hole-clamping end, each of predetermined diameter, external clamping means for sealably securing said small pipe-clamping end around the outside of a pipe member and internal clamping means, mounted within said large, hole-clamping end, including an internal, split clamping band and means for expanding the band radially to increase its diameter and compress the material of the connector against the said edge of said hole for internally clamping the hole clamping end of said sleeve inside said hole.

10. A flexible connector as specified in claim 9 wherein:

said internal, split, clamping band includes a pair of toggle arms pivotally attached and movable through an overcentre path of travel into a clamped, locked, expanded, position.

11. A flexible connector as specified in claim 9 wherein:

said sleeve includes an annular groove extending circumferentially around the inner face of the said hole clamping end; and said split clamping band is received in said groove.

12. In combination:

a reinforced concrete manhole riser having an upstanding cylindrical wall with an inner face and a smooth surfaced, circular, cored hole of predetermined diameter, a sewer pipe having one end, of predetermined diameter substantially less than the diameter of said hole, received within said hole substantially flush with said inner face of said riser, a tubular, elastic, flexible sleeve, or boot, having a large end loosely fitting in said hole, an opposite small end loosely fitting around said sewer pipe and a tapered portion between said ends, external clamp means extending around the small end of said sleeve for clamping said end tightly, and sealably, around said pipe, internal clamp means extending circumferentially around the inside of the large end of said sleeve, said means having a normal unexpanded diameter but being locked in an expanded condition to compress the material of said sleeve against the smooth surface of said hole to seal and clamp said large end therein.

13. A connector boot device for sealably joining a pipe to a reinforced concrete manhole riser formed with a hole which is defined by a smooth, core-drilled, circular edge, said connector boot device comprising a flexible, elastomeric, elongated tubular body having a large holeclamping end of substantially less outside diameter than the inside diameter of said hole;

a smaller pipe-clamping end and an intermediate tapered body portion extending between said ends;

internal clamping means mounted inside said hole clamping end for expanding said end radially, in a direction normal to the central longitudinal axis of said body to compress and clamp the material thereof against the smooth circular edge of said hole in clamped, tightly sealed relation therewith and external clamping means, mounted around the small pipe clamping end of the connector boot device for sealably clamping said end around said pipe member.

14. A connector boot device as specified in claim 13 wherein:

the pipe-clamping end is of a reduced diameter to support an inner end of the pipe inside the tubular connector in substantially concentrically spaced relation therewith.

15. A connector boot device as specified in claim 13 wherein:

the said intermediate body portion is of truncated conical shape defining a clearance space in which displacement of the pipe out of its concentrically disposed position may occur without blocking flow therethrough.

16. A connector boot device for sealably joining together a manhole riser having a porthole formed therein and a pipe section having one end positioned within the porthole, said device including:

an elongated, tapered flexible tubular body having a large cylinderical end, of predetermined diameter, loosely fitting within said hole, and having a central, longitudinal axis:

a truncated conical intermediate portion of said body, extending away from said large cylindrical end and terminating in a small cylindrical end engageable around said pipe section;

the large cylindrical end of said body being internally recessed to form an annular channel, or groove, and having an internal expandable clamp band supported in said channel and in full, radially expanded, locked position to exert clamping pressure in a direction normal to the said axis of said body.

* * * * *